(12) United States Patent
Liu et al.

(10) Patent No.: US 7,398,196 B1
(45) Date of Patent: Jul. 8, 2008

(54) METHOD AND APPARATUS FOR SUMMARIZING MULTIPLE DOCUMENTS USING A SUBSUMPTION MODEL

(75) Inventors: Weiquan Liu, Beijing (CN); Joe F Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 973 days.

(21) Appl. No.: 10/018,517

(22) PCT Filed: Sep. 7, 2000

(86) PCT No.: PCT/CN00/00265

§ 371 (c)(1), (2), (4) Date: Aug. 19, 2002

(87) PCT Pub. No.: WO02/21324

PCT Pub. Date: Mar. 14, 2002

(51) Int. Cl.
*G06F 17/20* (2006.01)
*G06F 17/21* (2006.01)
(52) U.S. Cl. .................. 704/1; 704/9; 715/277
(58) Field of Classification Search .......... 704/1, 704/8–10; 715/277
See application file for complete search history.

(56) References Cited

U.S. PATENT DOCUMENTS

| | | | | |
|---|---|---|---|---|
| 5,924,108 A | * | 7/1999 | Fein et al. | 715/531 |
| 5,963,940 A | * | 10/1999 | Liddy et al. | 704/9 |
| 6,076,088 A | * | 6/2000 | Paik et al. | 707/5 |
| 6,374,209 B1 | * | 4/2002 | Yoshimi et al. | 704/9 |
| 6,473,730 B1 | * | 10/2002 | McKeown et al. | 704/9 |
| 6,493,663 B1 | * | 12/2002 | Ueda | 704/9 |
| 6,537,325 B1 | * | 3/2003 | Nishizawa | 704/9 |
| 6,766,287 B1 | * | 7/2004 | Kupiec et al. | 704/9 |
| 7,162,413 B1 | * | 1/2007 | Johnson et al. | 704/9 |

FOREIGN PATENT DOCUMENTS

| | | |
|---|---|---|
| CN | 1133460 A | 10/1996 |
| EP | 0361464 A2 | 9/1989 |
| EP | 0737927 A2 | 10/1996 |
| EP | 0751470 A1 | 1/1997 |

OTHER PUBLICATIONS

McKeown et al. "Towards Multidocument Summarization by Reformulation: Progress and Prospects", In Proceedings of the Seventeenth National Conference on Artificial Intelligence(AAAI-99), Orlando, Florida, Jul. 1999, pp. 453-460.*

Goldstein et al. "Multi-document Summarization by Sentence Extraction", In Proceedingsof ANLP/NAACL-2000 Workshop on Automatic Summarization, 2000.*

(Continued)

*Primary Examiner*—Patrick N. Edouard
*Assistant Examiner*—James S. Wozniak
(74) *Attorney, Agent, or Firm*—Blakely, Sokoloff, Taylor & Zafman LLP

(57) ABSTRACT

A method and apparatus for parsing a plurality of documents, selecting paragraphs from the documents through subsuming relation calculation, and rewriting the selected paragraphs into a summary is disclosed.

15 Claims, 6 Drawing Sheets

OTHER PUBLICATIONS

Mitra et al. "Automatic Text Summarization by Paragraph Extraction", In Proceedings of the Workshop on Intelligent Scalable Summarization at the ACL/EACL Conference, pp. 39-46, 1997.*

McKeown et al. "Generating Summaries of Multiple News Articles", In Proceedings of the 18th Annual Internatzonal ACM SIGIR, pp. 74-82, 1995.*

Salton et al. "Automatic Text Structuring and Summarization." Information Processing and Management, vol. 33, No. 2, 1997, pp. 193-207.*

Radev et al. "Generating Natural Language Summaries from Multiple On-Line Sources." Computational Linguistics, Sep. 1998, 24(3): pp. 469-500.*

Hatzivassiloglou et al. "Detecting text similarity over short passages: Exploring linguistic feature combinations via machine learning." In Proceedings of the 1999 Joint SIGDAT Conferenceon Empirical Methods in Natural LanguageProcessing and Very Large Corpora, Jun. 1999, pp. 203-212.*

Mitra et al. "Automatic text summarization by paragraph extraction." In ACL/EACL-97 Workshop on Intelligent Scalable Text Summarization, Jul. 1997, pp. 31-36.*

* cited by examiner

METHOD AND APPARATUS FOR SUMMARIZING MULTIPLE DOCUMENTS USING A SUBSUMPTION MODEL

FIELD OF INVENTION

The present invention relates to the field of natural language processing, information retrieval, information extraction, and automatic summary and abstraction generation.

BACKGROUND OF THE INVENTION

The advent of the Information Age has brought with it an increase in the accessibility of data, accompanied by schemes for searching that data. One searching for specific data through the Internet or in other information systems using any of many search engines available is often presented with an lengthy list of documents which may or may not contain the data for which he was searching. Reading through such a lengthy list is undesirably time consuming.

To reduce the time needlessly wasted in such reading, a variety of technologies have been presented for summarizing multiple documents to express a theme central to these documents. However, all of these technologies are inherently limited in some aspect. Some are able to search only a specific domain of knowledge and are therefore difficult to implement for different applications. Some, without radical modification, can only search documents composed in certain languages. Some use deep language parsing, statistical, or term-vector based techniques, resulting in longer waits for search results and greater demands on computing resources. Almost all generate summaries by merely concatenating together text segments containing some keyword, often producing results which are incohesive due to anaphoric ambiguity. None use real natural language analyzing techniques. A method for summarizing multiple documents while avoiding these limitations is desirable.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details.

Figure 1:
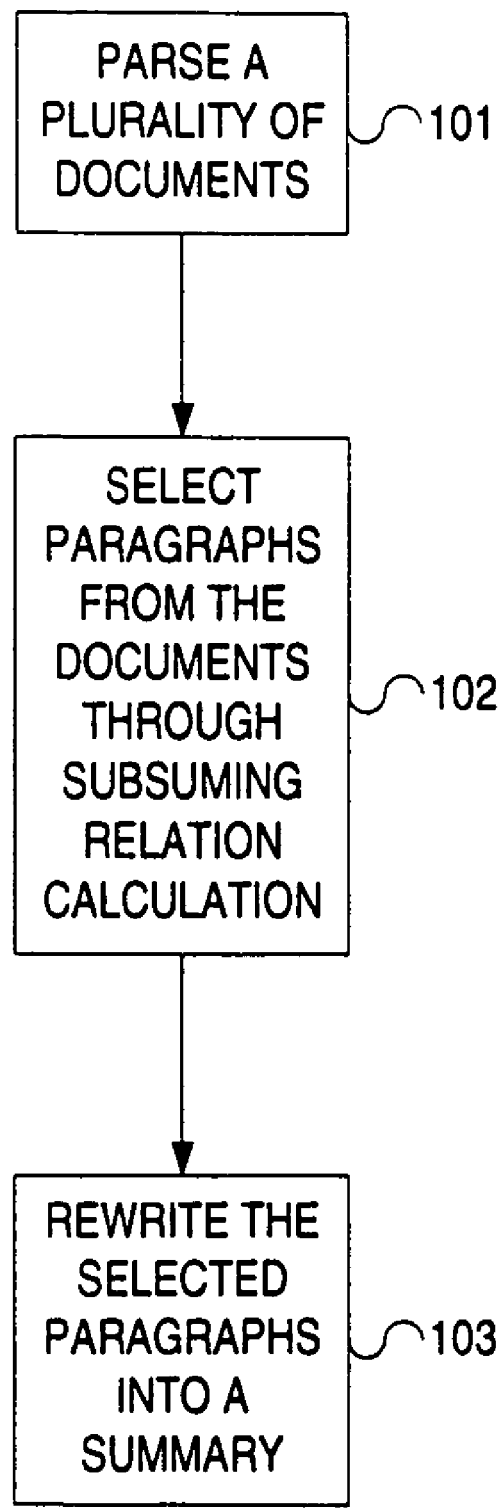
FIG. 1 is a flow diagram of one embodiment of a method for summarizing multiple documents using a subsumption model.

FIG. 1 is a flow diagram of one embodiment of a method for summarizing multiple documents using a subsumption model. In one embodiment, the content of the documents are co-related to one central topic. First, a plurality of documents are parsed, step 101. Then paragraphs are selected from the documents through subsuming relation calculation, step 102. Finally, the selected paragraphs are rewritten into a summary, step 103. Each of these steps is described in greater detail below.

Figure 2:
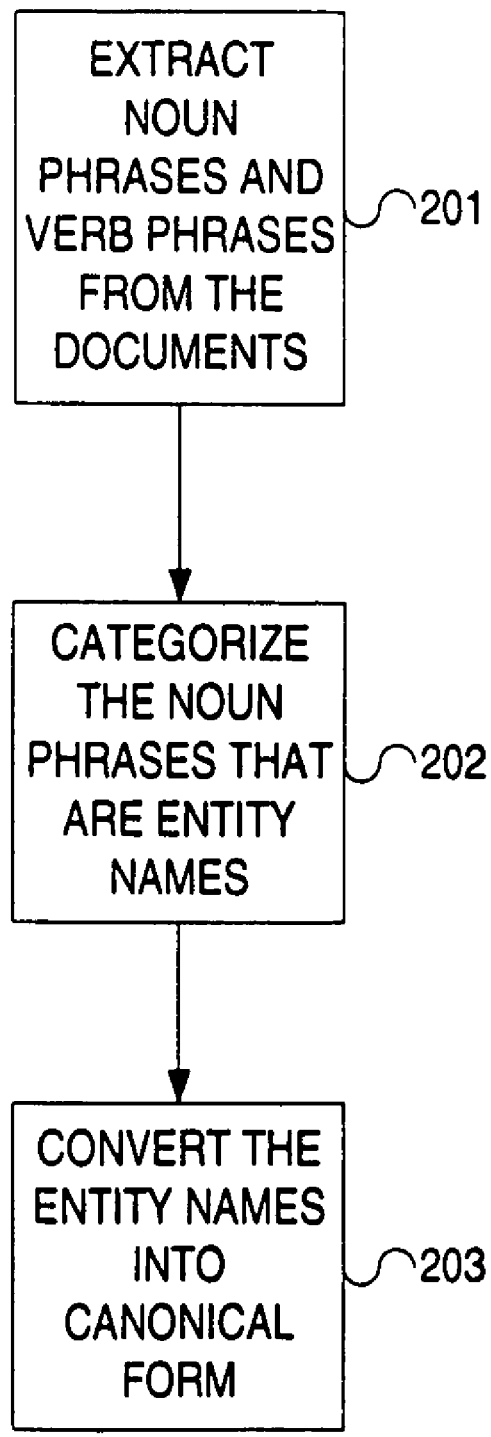
FIG. 2 is a flow diagram of one embodiment of parsing a plurality of documents.

FIG. 2 is a flow diagram of one embodiment of parsing a plurality of documents, corresponding to step 101 of FIG. 1. In one embodiment, parsing is accomplished by applying shallow natural language processing to text.

First, noun phrases and verb phrases are extracted from the documents, step 201. To accomplish this, the words in the documents are tagged according to their respective parts-of-speech. A set of rules is applied to bracket out the noun phrases and verb phrases in the documents by matching the part-of-speech tags according to predefined patterns. The noun phrases are further analyzed to identify entity names. A word with the first letter in uppercase denotes that it is part of an entity name. The use of entity name, noun phrase, and verb phrase recognition captures the features of documents while limiting the overhead involved in parsing to a minimum.

Next, the noun phrases that are entity names are categorized, step 202. Exemplary categories include people's names, company and organization names, addresses, currency amounts, dates, geographical locations, measurements, etc. In an embodiment where the documents all relate to one central topic, the detected noun phrases, verb phrases, and entity names have much in common.

Finally, the entity names are converted into canonical form, step 203. For example, "06/26100" would be converted to "Jun. 26, 2000". The identified entity names are input into a subsuming relation calculation.

Figure 3:
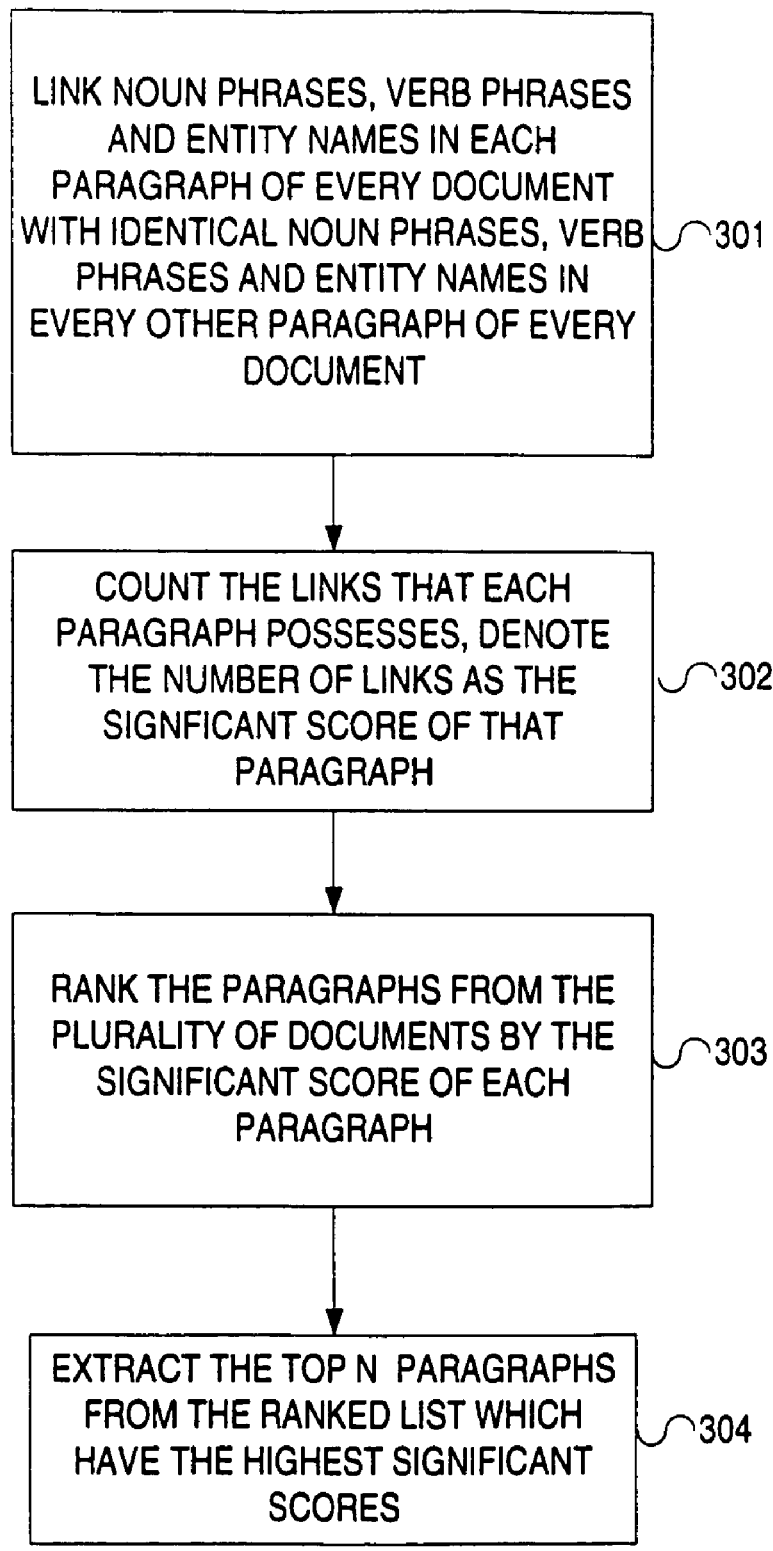
FIG. 3 is a flow diagram of one embodiment of selecting paragraphs from the documents through subsuming relation calculation.

FIG. 3 is a flow diagram of one embodiment of selecting, or in other words, extracting, paragraphs from the documents through subsuming relation calculation, corresponding to step 102 of FIG. 1. In one embodiment, the subsuming relation calculation is designed to calculate the inherent subsumption between paragraphs from each document. This process determines the significance of each paragraph. The noun phrases, verb phrases and/or entity names in the documents represent the content of those documents. Different paragraphs may share common noun/verb phrases and entity names. For example, if all the noun/verb phrases and entity names in a paragraph A are also in a paragraph B, then B subsumes A.

Figure 5:
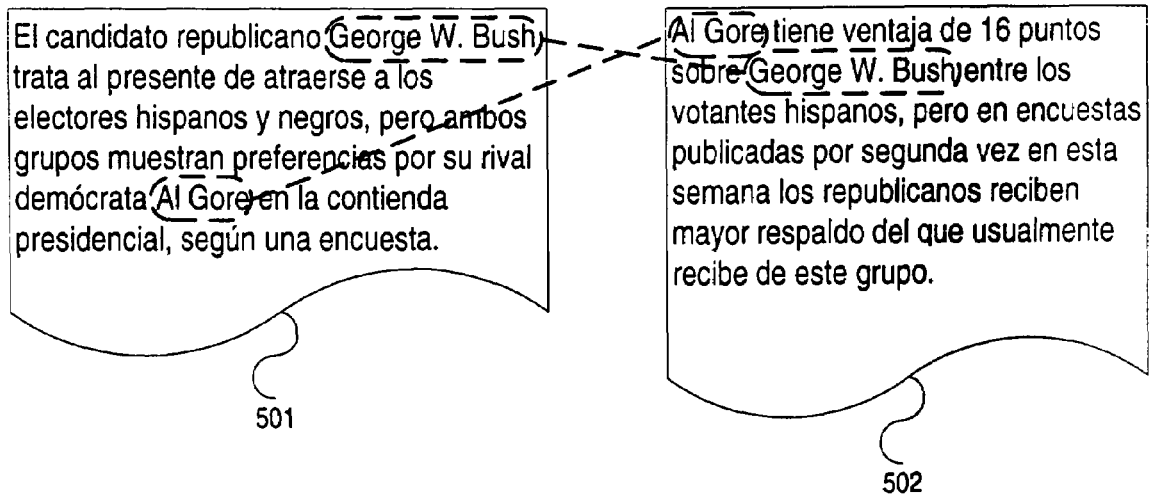
FIG. 5 is an example of one embodiment of linking entity names in paragraphs of documents.

First, noun/verb phrases and entity names in each paragraph of every document are linked with identical noun/verb phrases and entity names in other paragraphs of each document, step 301. Reference links are built between the common phrases and entity names shared by paragraphs. FIG. 5 discussed below illustrates an example of one embodiment of linking entity names in paragraphs of documents having a common topic independent of domain and being composed in a language other than English.

Next, the links for each paragraph are counted, step 302. The link count may be called a significance score. If a paragraph has more reference links, it is more significant than other paragraphs in representing the meaning of the documents. The more other paragraphs a given paragraph subsumes, the richer it is in content in comparison to the other paragraphs subsumed. Then, the paragraphs from the plurality of documents are ranked by their significant scores, step 303. The paragraphs with the most subsumption are relatively more dominative and informative. Therefore, these paragraphs are extracted, or in other words selected, prior to other paragraphs. In one embodiment, the top N paragraphs are bulleted, where N can be a predefined length factor decided jointly by an empirical function and a user's preference, step 304. The extracted paragraphs selected by the subsumption model are typically informative enough to represent the content of the central topic.

In one embodiment, the subsuming relation calculation is domain independent. It can process documents of a variety of topics. It does not assume any domain knowledge adaptation. Thus, it is relatively easy to implement for different applications.

Unlike other summarization systems, no statistic technique is used in the subsuming relation calculation. Therefore, no background corpus is needed to build a base frequency. The domain and length of the documents are not limited. The subsuming relation calculation is also not term-vector based, avoiding high dimension vector manipulation.

Figure 4:
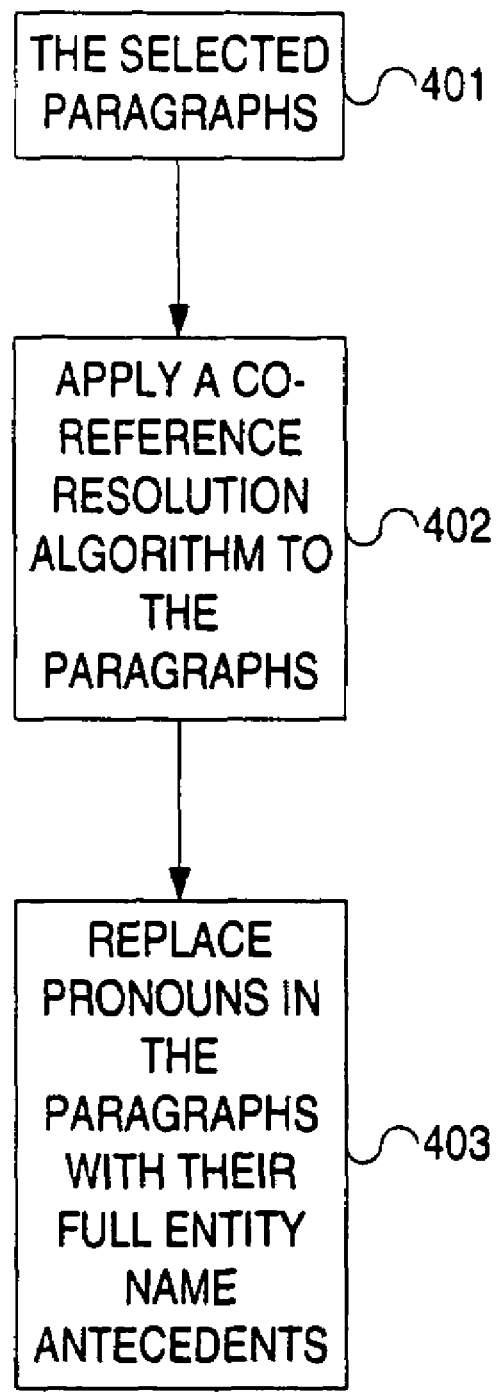
FIG. 4 is a flow diagram of one embodiment of rewriting the selected paragraphs into a summary.

FIG. 4 is a flow diagram of one embodiment of rewriting the selected paragraphs into a summary, corresponding to step 103 of FIG. 1. First, the paragraphs are ranked, step 401, by their significance score. In one embodiment, the top N paragraphs are bulleted, where N can be a predefined length factor decided jointly by an empirical function and a user's preference. Cohesiveness is less likely if these bulleted paragraphs are output as a summary without further processing. So a co-reference resolution algorithm is applied to the paragraphs, step 402, to resolve anaphoric ambiguity. There are a number of such algorithms in the public domain. By introducing the co-reference resolution, most anaphoric ambiguity is removed, thus making the result summary more cohesive.

For example, a document might read, "I met John and Mary this morning. He was driving a red car. It's a nice sports car. She was very happy." A reader may not notice any co-reference ambiguity in it, since it's obviously that "he" stands for John, "she" stands for Mary and "it" stands for the car. But the method and apparatus disclosed herein extracts the significant paragraphs (or sentences) for multiple documents and concatenates them into one text passage as a summary, and because these paragraphs may come from different documents, or different parts of the same document, they may contain pronouns that may refer to entity names in paragraphs that were not extracted and do not appear in the resulting summary. To reduce reader confusion, a one-to-one reference relation is built between each pronoun and its equivalent entity name.

Finally, the pronouns (for example, he, she, it, they, etc.) in the paragraphs are replaced with their full entity name antecedents, step 403. Thus, the readability of the output summary is improved.

The subsuming relation calculation can be applied to languages other than English. To apply the calculation to another language, only the shallow natural language processing and co-reference resolution components need to be modified. The core subsumption model is language independent.

FIG. 5 is an example of one embodiment of linking identical entity names in paragraphs of documents having a common topic independent of domain and being composed in a language other than English. One paragraph 501 contains entity names which are also contained in another paragraph 502. The identical entity names in each paragraph are linked according to the flow diagram in FIG. 3. Because all of the entity names in paragraph 501 are also contained in paragraph 502, paragraph 502 can be said to subsume paragraph 501.

Figure 6:
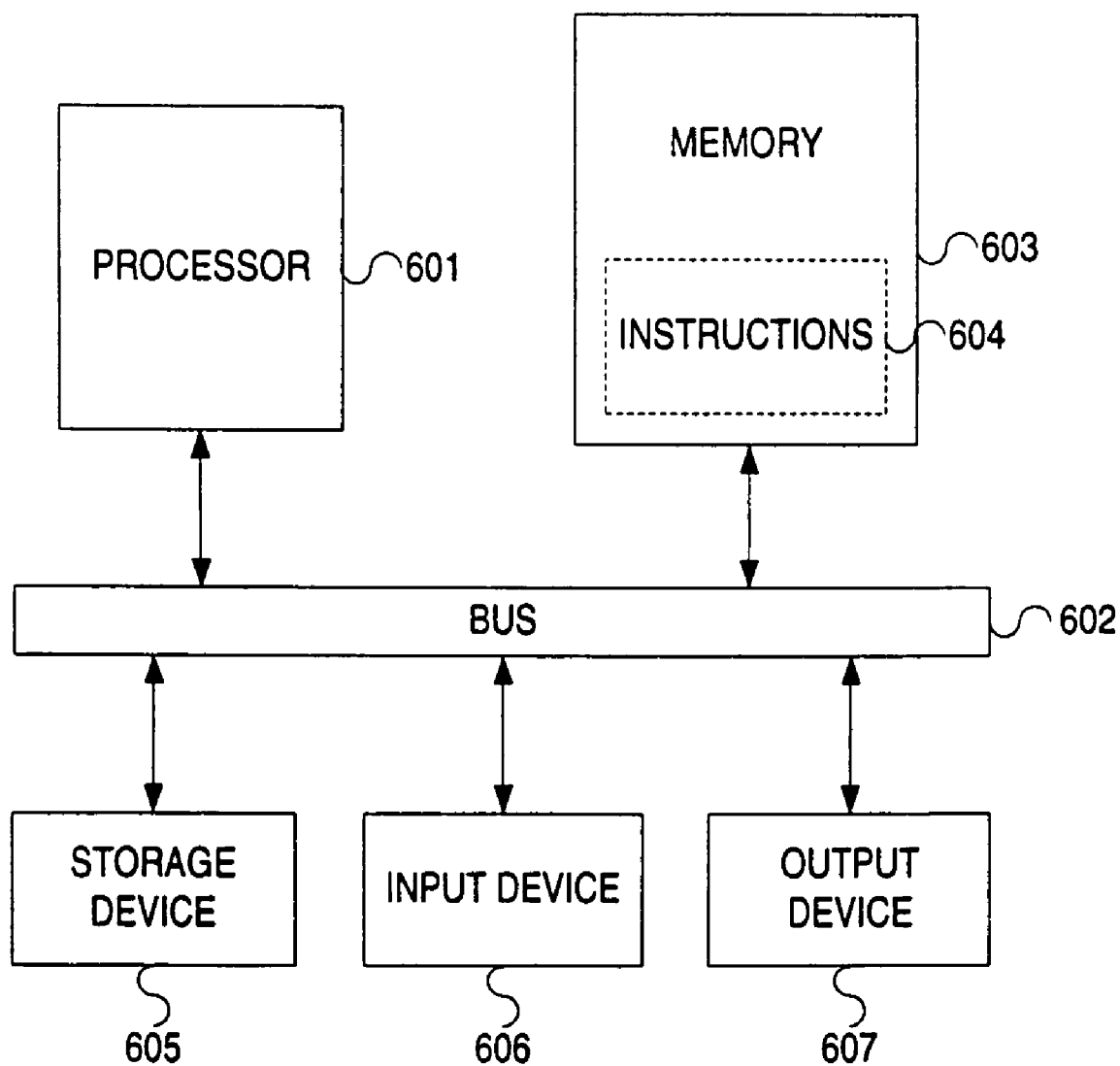
FIG. 6 is an example of one embodiment of a computer system.

The method and apparatus disclosed herein may be integrated into advanced Internet- or network-based knowledge systems as related to information retrieval, information extraction, and question and answer systems. FIG. 6 is an example of one embodiment of a computer system. The system shown has a processor 601 coupled to a bus 602. Also shown coupled to the bus are a memory 603 which may contain instructions 604. Additional components shown coupled to the bus are a storage device 605 (such as a hard drive, floppy drive, CD-ROM, DVD-ROM, etc.), an input device 606 (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed, as shown by way of example in FIG. 6. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
   parsing a plurality of paragraphs in a plurality of computer documents stored on a computer-readable medium, each document with one or more of the paragraphs;
   selecting paragraphs from the documents through a subsuming relation calculation including,
      creating a link from terms in each paragraph to identical terms in substantially all of the other paragraphs, wherein terms include noun phrases, verb phrases or entity names,
      counting for each paragraph the number of links from the terms in the paragraph to the terms in other paragraphs,
      denoting for each paragraph the number of links counted for that paragraph as the significant score of that paragraph,
      ranking the paragraphs by the significant score,
      selecting paragraphs based on the ranking, wherein paragraphs in the ranking that subsume the highest number of other paragraphs are selected prior to other paragraphs in the ranking, and wherein a first paragraph subsumes a second paragraph if all noun phrases verb phrases, and entity names contained in the second paragraph are also contained in the first paragraph;
   aggregating the selected paragraphs into a summary and outputting the summary.

2. The method of claim 1 wherein parsing further comprises:

extracting noun phrases and verb phrases from the documents;

categorizing the noun phrases that are entity names; and converting the entity names into canonical form.

3. The method of claim 1 further comprising:

applying a co-reference resolution algorithm to the selected paragraphs; and replacing pronouns in the selected paragraphs with their full entity name antecedents.

4. The method of claim 1 wherein the documents have a common topic independent of domain.

5. The method of claim 1 wherein the documents are composed in English or in a language other than English.

6. A computer-readable medium having stored thereon sequences of instructions which are executable by a processor, and which, when executed by the processor, cause the processor to perform operations comprising:

parsing a plurality of paragraphs in a plurality of computer documents, each document with one or more of the paragraphs;

selecting paragraphs from the documents through a subsuming relation calculation including, creating a link from terms in each paragraph to identical terms in substantially all of the other paragraphs, wherein terms include noun phrases, verb phrases or entity names, counting for each paragraph the number of links from the terms in the paragraph to the terms in other paragraphs, denoting for each paragraph the number of links counted for that paragraph as the significant score of that paragraph, ranking the paragraphs by the significant score, selecting paragraphs based on the ranking, wherein paragraphs in the ranking that subsume the highest number of other paragraphs are selected prior to other paragraphs in the ranking, and wherein a first paragraph subsumes a second paragraph if all noun phrases, verb phrases, and entity names contained in the second paragraph are also contained in the first paragraph;

aggregating the selected paragraphs into a summary; and outputting the summary.

7. The medium of claim 6 wherein parsing further comprises:

extracting noun phrases and verb phrases from the documents;

categorizing the noun phrases that are entity names; and converting the entity names into canonical form.

8. The medium of claim 6 further comprising instructions for:

applying a co-reference resolution algorithm to the selected paragraphs; and replacing pronouns in the selected paragraphs with their full entity name antecedents.

9. The medium of claim 6 wherein the documents have a common topic independent of domain.

10. The medium of claim 6 wherein the documents are composed in English or in a language other than English.

11. A system comprising:

a processor;

a bus coupled to the processor; and a unit coupled to the bus to:

parse a plurality of paragraphs in a plurality of computer documents, each document including one or more of the paragraphs, select paragraphs from the documents through a subsuming relation calculation including:

creating a link from terms in each paragraph to identical terms in substantially all of the other paragraphs, wherein terms include noun phrases, verb phrases or entity names, counting for each paragraph the number of links from the terms in the paragraph to the terms in other paragraphs, denoting for each paragraph the number of links counted for that paragraph as the significant score of that paragraph, ranking the paragraphs by the significant score, selecting paragraphs based on the ranking, wherein paragraphs in the ranking that subsume the highest number of other paragraphs are selected prior to other paragraphs in the ranking, and wherein a first paragraph subsumes a second paragraph if all noun phrases, verb phrases, and entity names contained in the second paragraph are also contained in the first paragraph;

aggregate the selected paragraphs into a summary; and outputting the summary.

12. The system of claim 11 wherein the unit further extracts noun phrases and verb phrases from the documents, categorizes the noun phrases that are entity names, and converts the entity names into canonical form.

13. The system of claim 11 wherein the unit further applies a co-reference resolution algorithm to the paragraphs, and replaces pronouns in the paragraphs with their full entity name antecedents.

14. The system of claim 11 wherein the documents have a common topic independent of domain.

15. The system of claim 11 wherein the documents are composed in English or in a language other than English.

* * * * *

UNITED STATES PATENT AND TRADEMARK OFFICE
CERTIFICATE OF CORRECTION

PATENT NO. : 7,398,196 B1
APPLICATION NO. : 10/018517
DATED : July 8, 2008
INVENTOR(S) : Liu et al.

Page 1 of 1

It is certified that error appears in the above-identified patent and that said Letters Patent is hereby corrected as shown below:

In column 2, at line 31, delete ""06/26100"" and insert --"06/26/00"--.

Signed and Sealed this

Twenty-third Day of December, 2008

JON W. DUDAS
*Director of the United States Patent and Trademark Office*